United States Patent [19]
Klimavicz et al.

[11] 4,097,998
[45] Jul. 4, 1978

[54] LINE OF SIGHT PLOTTER

[76] Inventors: Frank Klimavicz, Fort Belvoir, Va. 22060; Jack S. Chase, R.F.D. 1, Box 53, Jericho, Vt. 05465

[21] Appl. No.: 772,409

[22] Filed: Feb. 28, 1977

[51] Int. Cl.² .............................................. G01C 5/00
[52] U.S. Cl. ...................................... 33/1 G; 33/227; 33/1 SB
[58] Field of Search .......... 33/1 G, 1 H, 1 SB, 1 DD, 33/1 R, 227, 228, 274, 275; 35/25

[56] References Cited

U.S. PATENT DOCUMENTS

| | | | |
|---|---|---|---|
| 2,469,387 | 5/1949 | Heckman | 33/274 |
| 2,763,932 | 9/1956 | McMillan | 33/275 R |

FOREIGN PATENT DOCUMENTS 9,936 of 1886 United Kingdom ................... 33/274

Primary Examiner—Richard E. Aegerter
Assistant Examiner—John W. Shepperd
Attorney, Agent, or Firm—Thomas O. Maser

[57] ABSTRACT

Apparatus for determining whether an intermediate terrain feature blocks the line of sight between a pair of spaced terrain points, comprising a linearly extending base, at least three spaced posts extending perpendicularly to the base and having cursors on them, the distances between the posts being selectively adjustable. In one embodiment, the base is of three telescopic sections, with a post mounted on each of the sections. In another embodiment, the base is fixed and has three sliders, on each of which a post is mounted. The posts are pivotally mounted on the base, so as to be stored substantially parallel to the base.

10 Claims, 5 Drawing Figures

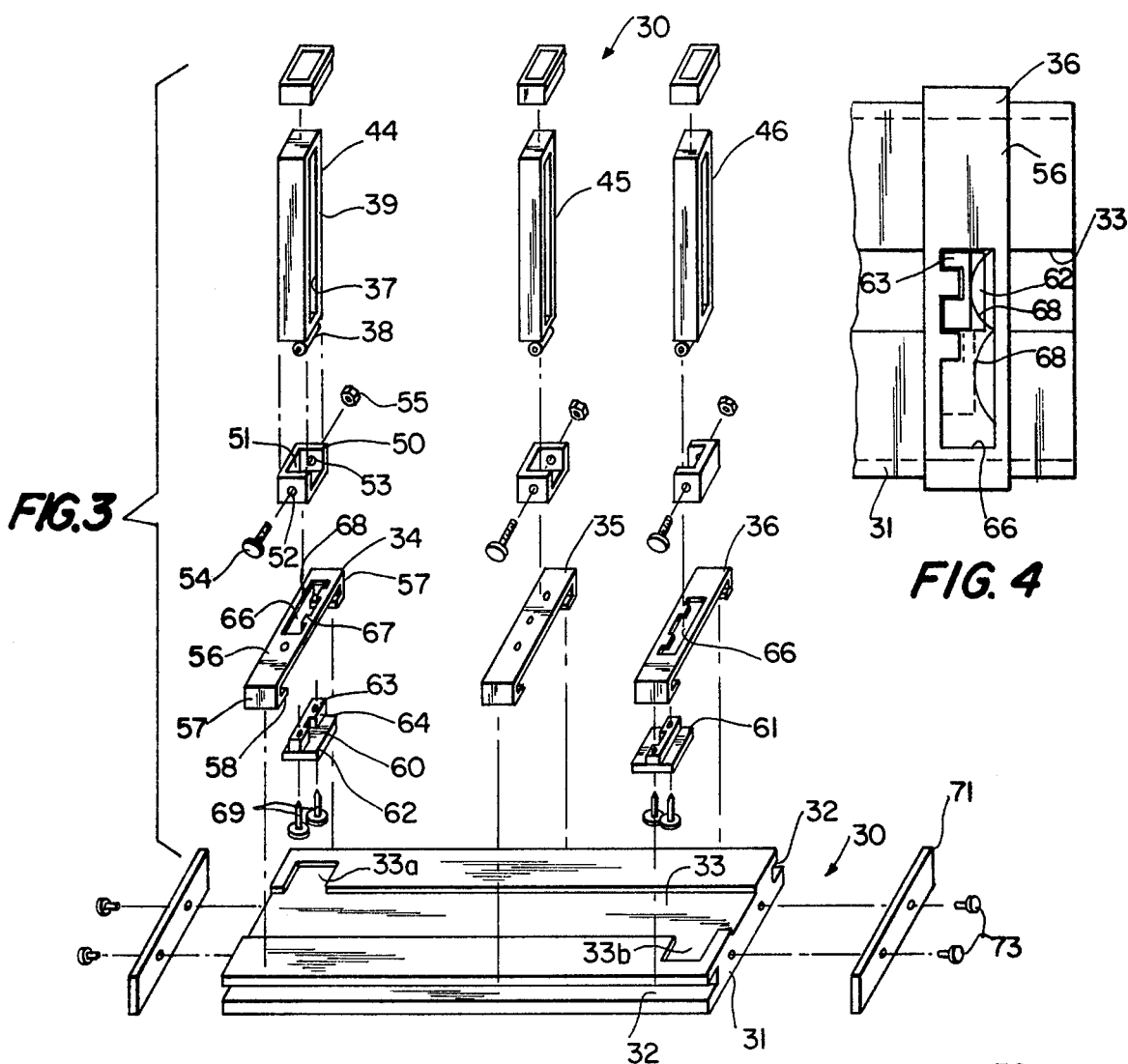
FIG. 3
FIG. 4
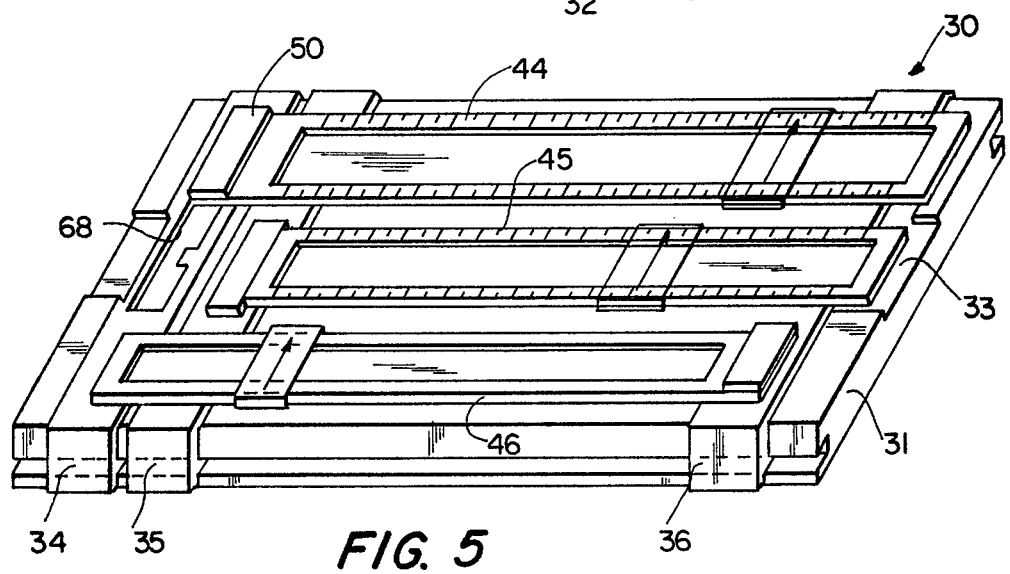
FIG. 5

4,097,998

LINE OF SIGHT PLOTTER

BACKGROUND OF THE INVENTION

The present invention relates to apparatus for use in connection with maps to aid in determining whether there is a line of sight between two spaced points of the terrain which is represented by the map.

Various devices have been proposed for determining whether such articles as rails and pipes extend along a straight line, these generally including a plurality, such as three, of elements which are caused to be attached to or associated with the pipe or rail at three spaced apart points.

In one such apparatus, for use in hanging and lining up shafting, there were provided three posts which were attachable to the shafts, and which depended generally perpendicularly to the shaft. One post carried a sighting telescope which could be adjusted vertically, and other posts contained sighting targets, for sighting through the telescope. When the sighting telescope and targets were in alignment, the shaft was deemed to be extending in a straight line.

Similar organizations were provided in connection with the laying of railway track. In these instances, posts were attached to the tracks at three spaced apart points, one of the posts having a sighting cursor, used to sight across the top of the next two posts which had been mounted on the rail. When the tops of the other two posts were sighted as being in alignment with the cursor, it was thereby determined that the rail was straight.

Other apparatus of interest in connection with the herein disclosed subject matter included various alidades, used for constructing maps, sighting fires from a look-out point, and the like. These usually included a rotatable base, with a pair of posts extending generally perpendicularly to the base, and with cursors movable along the posts. Thus, an angle to the horizontal could be established by lining up a particular terrain feature with the two cursors on the two posts, and thereby the position of this terrain feature from the observation point determined.

None of the known apparatus, however, is suitable for determining, from use thereof in cooperation with a map, whether an intervening terrain feature shown on the map will or will not block the line of sight between two other terrain features represented by the map, and lying on either side of the noted intermediate terrain feature.

SUMMARY OF THE INVENTION

The present apparatus is to be used in conjunction with a map, and provides a longitudinally extending base, and three, or more, posts which may be positioned to extend generally perpendicularly to the base, each of the posts being provided with a cursor. The distances between the posts are selectively adjustable. In this way, the spacing between the posts may be made to simulate the spacing between the three points of interest which are on the map and which represent points of interest of the actual terrain. In one embodiment, the base is made up of three, or more, telescopic sections, with a post mounted on each of the sections. Thus, by telescoping the sections relative to each other, more or less, there may be provided a duplication of the relative spacing of the points of interest. Preferably, the mounting of each post on the telescopic base section is by a hinge, so that the posts may be folded so as to lie generally parallel to the telescopic base.

In another embodiment, the base is of fixed length, and is provided with sliders for sliding movement therealong, each of the sliders carrying a post. These sliders, also, are provided with cursors, and preferably each slider is provided with a sighting opening extending longitudinally therein. The base, in this embodiment, is of flat, rectangular cross section, with the long dimension of the rectangle lying horizontally. The sides are provided with grooves, and the sliders are provided with tongues, to facilitate movement longitudinally of the base. In addition, the two end sliders are provided with openings extending transversely to the base, each opening extending from a median portion of the longitudinally extending base laterally to one side, these openings being off-set from each other. The openings are provided with serrations and a mounting element is provided with corresponding serrations, so that the mounting elements, each for a post, may be positioned either on the common central line of the base, or by movement to the off-set portions of the transverse openings of the sliders, the post may be off-set from each other. Then, when the posts are folded, they are in side-by-side relationship, to provide compactness.

Among the objects of the present invention are to provide an apparatus for enabling the determination, from a map, of whether an intermediate terrain point represented on the map blocks the line of sight between a pair of spaced points of the terrain.

Another object of the present invention is the provision of such an apparatus which may be readily constructed of available materials, using conventional processes and equipment.

Yet another object of the present invention is to provide such an apparatus which is readily useable, without requiring mathematical analysis or diagramatic construction.

A further object of the present invention is the provision of such an apparatus which may be readily folded for transport.

Other objects and many of the attendant advantages of the present invention will be readily understood from the following specification and claims, and of the appended drawings.

BRIEF DESCRIPTION OF THE DRAWINGS

FIG. 3 is a perspective view, exploded, of the apparatus shown in FIG. 2.

FIG. 4 is a cross sectional view taken on the line 4—4 of FIG. 2.

FIG. 5 is a perspective view of the apparatus of FIG. 2.

DESCRIPTION OF THE PREFERRED EMBODIMENTS

Figure 1:
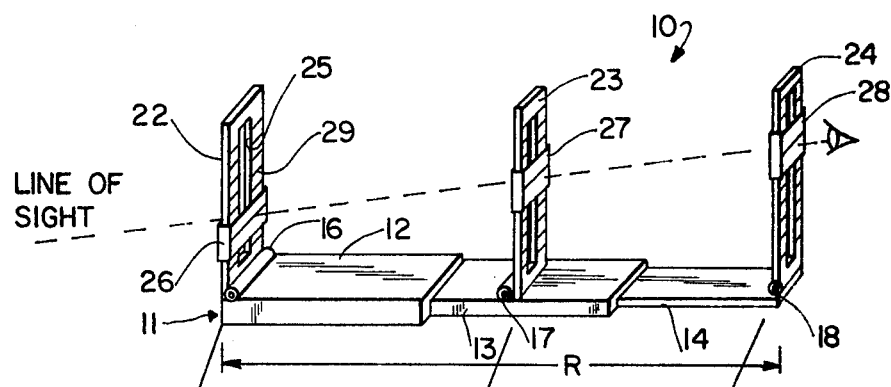
FIG. 1 is a perspective view of an apparatus in accordance with the present invention, and a map with which it is being used.

Referring now to the drawings, wherein like or corresponding reference numerals are used to designate like or corresponding parts throughout the several views, in FIG. 1 there is shown a map generally designated M, having stream S and a road R, with a bridge B carrying the road R over the stream S. The center of the bridge B is one point of interest, and another end point of interest is an observation point designated O.P. located at the crest of a hill H. An intermediate point of interest between the bridge B and observation point O.P. is the crest C of an intermediate hill lying between the bridge B and the observation point O.P. As will be understood, depending upon the height of the crest C and its location along the line between the bridge B and the observation point O.P., the crest will or will not block the line of sight between the bridge B and the observation point O.P.

Also disclosed in FIG. 1 is a plotter instrument generally designated 10, and comprising a base 11 including a first telescopic section 12, a second telescopic section 13 of a size to be received within the section 12, and a third telescopic section 14, of a size to be received in the section 13. A post is mounted on the sections 12, 13, 14, there being shown mounted on the section 12 a post 22, on the section 13 a post 23 and on the section 14 a post 24. Each of the posts is generally similar in configuration, having a sighting opening, such as sighting opening 25 of post 22, extending longitudinally thereof. As will be seen, each of the posts 22, 23 and 24 extends upwardly from the base 11, generally perpendicularly thereto, the three posts 22, 23 and 24 being in parallel relationship, being spaced apart, and lying in a common plane extending through the three posts.

A hinge 16 rotatably supports the post 22 on the first telescopic section 12, so that it may be folded or pivoted downwardly, so as to lie adjacent the upper surface of the section 12. Similarly, a hinge 17 is provided for pivotally connecting and mounting the post 23 on the intermediate telescopic section 13, and a hinge 18 is provided for mounting the post 24 on the telescopic section 14. A cursor is provided on each of the posts 22, 23 and 24, there being a cursor 26 on the post 22, a cursor 27 on the post 23 and a cursor 28 on the post 24. Each of the cursors is transparent, and has a indicia line extending across it, which is generally horizontal when the base 11 is horizontal. In addition, each of the posts is provided with transverse, horizontal indicating lines, such as indicating lines 29 on the post 22.

In use, the map M is placed in position, as on a table, and the plotter 10 is placed on the map M, and more particularly, as indicated, the post 22 is positioned over the bridge B, the post 23 is positioned over the crest C and the post 24 is placed over the observation point O.P. As will be recognized, this is accomplished by relative telescopic movement of the three sections 12, 13 and 14 of the base 11. Next, the elevation of the bridge B is determined, and the cursor 26 is positioned along the height of the post 22 in relationship to the height of the bridge B. Next, the cursors 27 and 28 are positioned on the posts 23 and 24, respectively, in similar relationship to the height or elevation of the crest C and the observation point O.P. The observer then sights through the three cursors and the sight openings of the three posts, and in particular provides a line of sight, as indicated, from the indicating line on the cursor 28 to the indicating line on the cursor 26. If the indicating line on cursor 27 is above the line of sight, then it is immediately apparent that there is no line of sight between the bridge B and the observation point O.P., due to the presence of the intervening crest C. On the other hand, if the indicating line of the cursor 27 is below the line of sight between the cursors 26 and 28, then it will be immediately apparent that there is a line of sight between the bridge B and the observation point O.P.

For transport, the three posts 22, 23 and 24 may be pivoted or folded, by the hinges 16, 17 and 18, so that they lie generally flat and parallel to the base 11.

Figure 2:
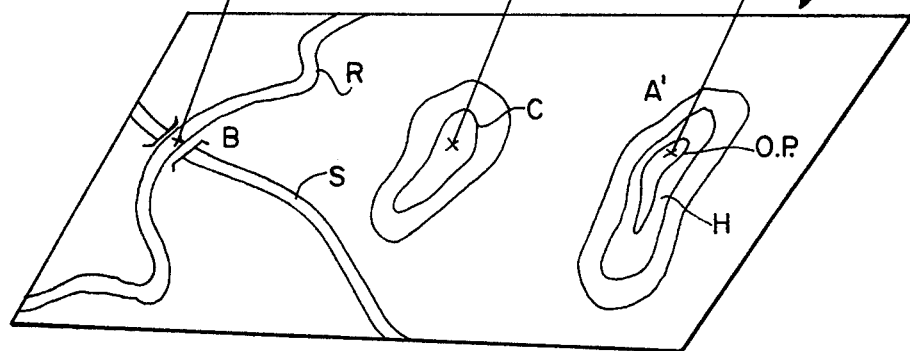
FIG. 2 is perspective view of an alternate embodiment of the apparatus.
Figure 2:
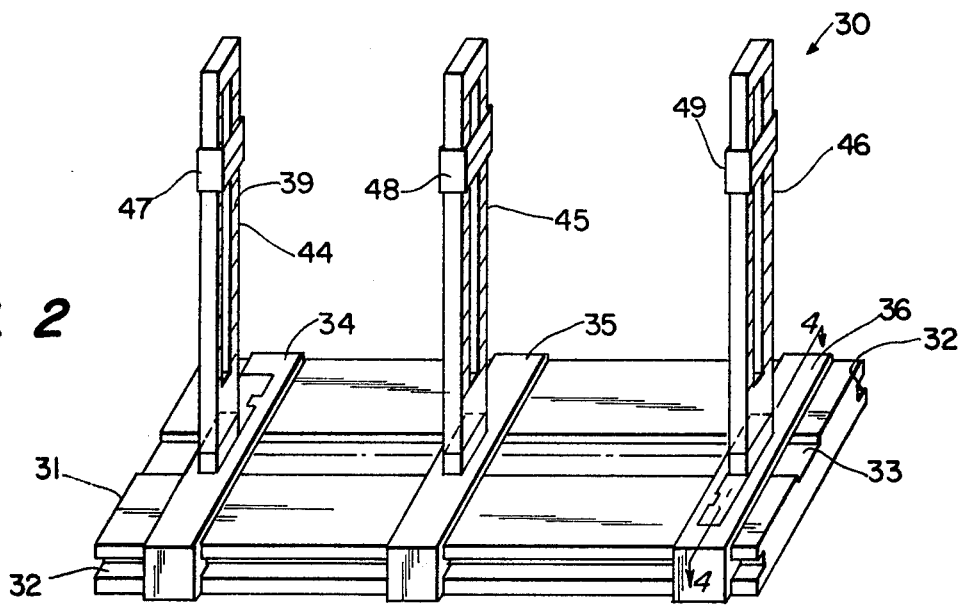

Referring now to FIG. 2, there is shown an alternate embodiment of the present plotter, designated 30. The base 31 will be seen to be generally flat and of substantially rectangular transverse cross section, base 31 extending linearly for any suitable length. Base 31 may be made of suitable material, such as wood, plastic or metal. It is provided in its sides with side grooves 32, and on its upper surface, adjacent the transverse medium plane of the base 31, with a groove 33.

There are provided on the base 31 three sliders 34, 35 and 36. Each of the sliders supports a post 44, 45 and 46, respectively, and each of the posts is generally similar to the posts of FIG. 1. Further, each of the posts 44, 45 and 46 is provided with a cursor 47, 48 and 49, respectively, which is generally similar to the cursors of the embodiment shown in FIG. 1, and each of the posts is preferably provided with indicia such as the indicia 39 shown on the post 44.

Referring now to FIG. 3, there is shown an exploded perspective view of the plotter 30. The central slot 33 has transverse and off-set recesses 33 a and 33 b located at the opposite ends thereof.

Each of the posts 44, 45 and 46 is substantially identical, being longitudinally extending, of rectangular transverse cross section, and having a central sighting opening therein. Thus, the post 44 is provided with a sight opening 37. At its lower end, it has a trunnion 38, in the form of a small cylinder secured or made integral with the post, and extending transversely thereof, with a suitable aperture extending longitudinally through it. A post mount 50 is provided, being generally in the shape of a block, and having a recess 51 therein for receiving the trunion 38. The end walls 52 and 53 of the trunion 50 are provided with aligned openings, so that a bolt 54 may be passed through the openings in the end walls 52, 53, and also through the aperture in the trunnion 38, the end of the bolt having secured to it a nut 55. This thereby provides pivotal mounting of the post 44 relative to the mount 50.

Slide 34 comprises an upper plate 56, a pair of depending sides 57 and at their lower ends there are provided inwardly turned tongues 58, which latter enter into the grooves 32 to facilitate the maintaining of the assembled relationship of the sliders 34 on the base 31.

In order to provide for movement of the posts from the position shown in FIGS. 2 and 3, in which the posts are coplanar, and also to provide for mounting of the respective posts and its mount on the slider, there is provided for the end posts 44 and 46 a support block, the support block for the post 44 being designated 60, and the support block for the post 46 being designated 61. Each support block is generally similar, comprising a bottom plate 62 which has a height substantially equal to the depth of the groove 33 in base 31, and a width substantially equal to the width of the groove 33. Extending upwardly from the plate 62 is a protuberance 63 which is generally parallelipipedal, but having an indenture on one surface, extending upwardly from the plate 62.

The plate 56 of the slider 34 is provided with a longitudinally extending opening which lies generally transversely of the base 31. The opening 66 has one edge thereof indented, as shown at 67, so that there are provided a pair of teeth or serrations extending inwardly into the opening 66. Opposite the edge 67, there is provided a pair of bowed springs 68. The teeth or serrations of the edge 67 substantially conform to the size and shape of the indenture 64 in the protuberance 63, and in the assembled relationship, the protuberance 63 extends upwardly into the opening 66. The mount 50 rests on the upper surface of the protuberance 63, and the mount 50 is secured to the support block 60 by suitable screws 69.

As will be apparent from FIG. 3, the opening 66 of the slider 34 extends from the medium or central part of the base 31, overlying the groove 33, and laterally to one side of the base 31, while the corresponding opening 66 in the slider 36 is off-set therefrom, extending to the other side of the base 31 from the central portion of base 31, wherein it overlies the groove 33. An end plate 71, extending to the height and width of the base 31, is mounted to each end of the base by screws 73 to lock the sliders 34, 35 and 36 into the slots 32.

Referring now to FIG. 4, there may be seen the slider 36, with the opening 66 in plate 56 thereof. The serrated or indentured edge may be seen, opposite which is the straight edge having the springs 68 secured to it. The protuberance 63 may be seen, with the indenture thereof mating with the serrations of the irregular edge of the opening 66. The plate 62 will be seen, underlying the plate 56, plate 62 being in the groove 33.

The post 46, including the mount 50 and the support block 60, all secured as a unit, may be moved to the right as shown in FIGS. 2, 3 and 4, while the slider 36 is held stationary. This will compress the spring 68 which is immediately rearwardly of the protuberance 63, and permit disengagement of the indenture of protuberance 63 from the first irregularity or tooth of the left hand edge of the opening 66, seen in FIG. 4. Then the assemblage of the post 46, its mount 50 and the attached support block 61 may be moved longitudinally of the opening 66, and then permitted to move to the left, under the influence of the second spring 68, so as to establish engagement of the protuberance 63 with the other of the teeth or serrations of the edge 66. This movement of the post 46 from a position on the median line of the base 31, wherein it overlies the groove 33, to a laterally off-set position, is permitted due to the provision of the off-set recess 33b of the groove 33.

As will be understood, opposite lateral movement of the post 44 is permitted by the similar construction of the slider 34 and the off-set recess 33a. Thus, the posts 44, 45 and 46 may either occupy positions in which they are coplanar, as shown in FIG. 2, or all laterally off-set from each other, as shown in FIG. 5.

The slider 35 does not have an opening corresponding to the opening 66, as it is unnecessary to move, laterally of base 31, the post 45. In other words, it may remain in the central plane of the base 31. To that end, screws 69 may pass through the slider 35 and secure the mount 50 directly to slider 35.

For compact folding and storage of the plotter 30, reference is made to FIG. 5. Slider 34 may be seen near the left end, with slider 35 adjacent to it, and slider 36 adjacent the right end of the base 31. Post 44, and its mount 50 may be seen to be laterally of the central groove 33 of base 31. Also, laterally of the groove 33, but off-set from post 44, is the post 46 carried by the slider 36. Post 45 is between the posts 44 and 46, so that the posts are in side-by-side relationship. Each of the posts has been pivoted or folded, due to the pivotal construction permitted by the mount 50 and trunnion 38, so that the three posts are all substantially parallel to the base 31, and the entire plotter 30 is in compact, flat condition for ready transport and/or storage.

As will be understood, the plotter 30 functions for determining the availability of a line of sight in the same manner as the plotter 10, and the explanation hereinabove given for the operation of the plotter 10 is equally applicable to the plotter 30.

There has been provided herein a disclosure of plotters permitting the determination of whether a line of sight exists between two spaced apart terrain features, by utilizing a map and the plotter, and thereby gain knowledge of whether an intervening promontory will prevent a line of sight between two terrain features of interest. The plotters herein disclosed are made of readily available materials, utilizing conventional techniques, and thereby may be fabricated readily and economically. Further, the herein disclosed plotters are simple to operate, requiring little of no supplementary mathmetical calculations, and they may be readily folded into compact position for storage and transportation.

It will be obvious to those skilled in the art that various changes may be made without departing from the spirit of the invention, and therefore the invention is not limited to what is shown in the drawings and described in the specification but only as indicated in the appended claims.

We claim:

1. Apparatus for determining the existance of a line of sight between two spaced points on a map having an intervening rise between said spaced points comprising:
   a linearly extending base,
   at least three posts, each of said posts having a sighting opening extending longitudinally thereof,
   means for mounting said posts on said base for extension upwardly therefrom in spaced, substantially parallel and coplanar relationship,
   means for adjusting the distances between the said posts, and
   cursor means slidably attached to each of said posts for longitudinal movement thereon, said cursor means comprising an indicia extending across said sight opening.

2. The apparatus of claim 1, wherein said base is telescopic, and comprises a telescopic section for each said post, said means for mounting said posts on said base comprising means for mounting each of said posts on an individual one of said telescopic sections of said base, and wherein said telescopic base and said mounting means comprises the means for adjusting the distance between said posts.

3. The apparatus of claim 2, wherein said means for mounting said posts on said base comprises hinge means for permitting pivotal movement of said posts to and from said positions and positions in which said posts lie generally parallel to said base.

4. The apparatus of claim 1, wherein said means for mounting said posts on said base and for adjusting the distances between posts comprises plural slider means engaging said base for sliding movement therealong, and means for mounting each said post on a said slider means.

5. The apparatus of claim 4, said base having at least one longitudinally extending groove in the exterior thereof, and each said slider means having a tongue extending into said groove of said base.

6. The apparatus of claim 4, wherein said means for mounting said posts on said slider means comprises hinge means for permitting pivotal movement of said posts on said slider means for movement of said posts from said position extending upwardly from said base to positions generally parallel to said base.

7. The apparatus of claim 6, and further including mounting means for at least two of said hinge means for permitting movement of at least said two of said hinge means and the posts mounted thereby into noncoplanar relationship, whereby to permit said posts to be pivoted on said hinges into side-by-side positions substantially parallel to said base.

8. The apparatus of claim 7, wherein a said slider has an opening extending transversely of said base, said mounting means for said hinge means comprising serrations along one edge of said opening of said slider, a support for said hinge means of lesser length and width than the length and width of said opening and comprising means for cooperation with said serrations for permitting engagement of said hinge support with said serrations in alternate positions thereof along the length of said opening.

9. The apparatus of claim 8, and spring means for urging said hinge support into engagement with said serrations and for permitting disengagement therefrom.

10. The apparatus of claim 8, wherein there are three said posts, and wherein said sliders for the end posts are both provided with said springs, and wherein said openings each extends from adjacent a side of said base inwardly toward the center of said base, with said openings being off-set one from the other.

* * * * *